United States Patent [19]

Simon

[11] 4,042,546

[45] Aug. 16, 1977

[54] REACTIVE POLYESTER-AMIDE POLYMERS AS CO-REACTANTS OR CURING AGENTS FOR POLYEPOXIDES AND POLYISOCYANATES

[76] Inventor: Eli Simon, 7175 Little Harbor Drive, Huntington Beach, Calif. 92648

[21] Appl. No.: 682,474

[22] Filed: May 3, 1976

[51] Int. Cl.$^2$ .................. C08G 69/44; C09D 3/70; C09D 3/72

[52] U.S. Cl. .................. 260/22 R; 260/22 EP; 260/26; 260/75 N; 260/77; 260/835

[58] Field of Search .................. 260/77, 22 R, 75 N, 260/26

[56] References Cited

U.S. PATENT DOCUMENTS

| | | | |
|---|---|---|---|
| 1,098,728 | 6/1914 | Howell | 260/22 R |
| 2,333,639 | 11/1943 | Christ et al. | 260/77 |
| 2,490,001 | 11/1949 | Jayne et al. | 260/77 |
| 2,490,003 | 11/1949 | Jayne et al. | 260/77 |
| 2,706,191 | 4/1955 | Holmen | 260/22 R |
| 3,053,783 | 9/1962 | Broadhead et al. | 260/75 N |
| 3,070,256 | 12/1962 | Bremmer et al. | 260/77 |
| 3,476,697 | 11/1969 | Clements | 260/22 R |
| 3,655,596 | 4/1972 | Kozu et al. | 260/22 R |
| 3,900,436 | 8/1975 | Drawert et al. | 260/22 R |

*Primary Examiner*—Ronald W. Griffin

[57] ABSTRACT

The reactive polyester-amide polymers of this invention are comprised of trihydric alcohols, aminoalcohols, and aliphatic dicarboxylic acids, containing an excess of functional groups reactive with carboxylic acid, and condensation heat-polymerized to an acid number of approximately 50.

The polymerization is carried short of gelation so that the polymer remains soluble in solvents. Cure is subsequently effected by using the reactive polyester-amide, either from solution or as 100% solids, as a co-reactant with polyepoxides and polyisocyanates at relatively low temperatures.

The preferred ratio of the components of the polyester-amide polymers of this invention is approximately 1-mol of a trihydric alcohol: 1-mol of a monoamino-monohydric alcohol: 2-moles of an aliphatic dibasic acid. The cured reaction products of reactive polyester-amide with polyepoxides and polyisocyanates can be controlled from rigid-brittle to rigid-flexible to soft-flexible depending on the selection and the mol ratios of the resin components. Reaction with polyepoxides and polyisocyanates may be conducted at room temperature or accelerated by elevating the temperature, concomitantly increasing the toughness of the cured products, having useable temperature ranges from about $-40°$ C. to $200°$ C.

3 Claims, No Drawings

REACTIVE POLYESTER-AMIDE POLYMERS AS CO-REACTANTS OR CURING AGENTS FOR POLYEPOXIDES AND POLYISOCYANATES

BACKGROUND AND PRIOR ART

This invention circumvents prior requirements for temperatures in excess of approximately 175° C. to thermoset polyester-amides for use as coatings, caulking compounds, etc; in addition, prior heat-converted products were generally hot-short, or had limited elongation at elevated temperatures, and were restricted in the ability to modify their physical properties such as hardness, modulus, and flexibility.

It is an object of this invention to expand the application of fluid or thermoplastic polyester-amide polymers by providing them with multiple hydrogen-labile sites reactive with epoxy and isocyanate functional groups at relatively low temperatures, the reaction products being new and novel and having variably-controlled physical properties.

SUMMARY OF THE INVENTION

This invention discloses new and novel polyester-amide polymers reactive with polyepoxides and polyisocyanates to form improved, useful products. The polyester-amides are identified as "reactive" and are prepared by condensation between selected ratios of polyhydric alcohols, amino alcohols, and aliphatic dibasic acids, the acid number varying from approximately 25-100 with a preferred range of 35-75.

The fundamental reactive polyester-amide is comprised of 1-mol of a trihydric alcohol (selected from glycerol, tris(2-hydroxyethyl)isocyanurate, 1-2-4-hexanetriol, trimethylolpropane, and trimethylolethane), 1-mol of a monoamino-monohydric alcohol (selected from 2-amino-1-butanol and 2-amino-2-methyl-1-propanol), and 2-moles of a dibasic aliphatic acid (selected from adipic, pimelic, suberic, azelaic, and sebacic); in each of these component classifications, they may be used individually or combined, such as ½ mol-glycerol plus ½-mol tris(2-hydroxyethyl)isocyanurate sebacic plus adipic acid, etc., provided the approximate 1:1:2 mol ratio indicated is maintained.

Variations from the "fundamental" reactive polyester-amide include minor deviations from the "1:1:2" ratio, the addition of modified polyols (i.e., castor oil, lignin, and monoesters of pentaerythritol), and polymerized fatty acids, separately and up to approximately 0.25 mol each, and the use of oxazoline polyols as partial or total replacement of the trihydric alcohol.

DESCRIPTION OF THE INVENTION

The reactive polyester-amide polymers of this invention comprise condensation products of polyols, aminoalcohols, and aliphatic dibasic acids in a preferred proportion of 1-mol of a single or mixed triol:1-mol of a monoamino-monohydric alcohol:2-moles of a single or mixed dibasic acid. The condensation is initiated at approximately 125° C. (using conventional techniques) to solubilize the components, and is completed at approximately 200° C. to an acid number of 25-100.

The reactive polyester-amides contain multiple sites reactive with oxirane and isocyanate groups and may effectively be used as curing agents or co-reactants with polyisocyanates and polyepoxides at ambient or slightly elevated temperatures. Calculation of the equivalent weight of reactive polyester-amide per oxirane or per isocyanate can be based on the number of reactive sites or labile hydrogens, either at the acid number of the polyester-amide or for an assumed acid number of zero; in the latter case, the equivalent weight is increased relative to the oxirane or isocyanate equivalent, and is generally the method of choice as it tends to improve the toughness of the cured reaction products. The following is illustrative of the difference in the polyester-amide equivalents at an assumed acid number of zero compared to the processed acid number of 56 for the polyester-amide of: 1-mol glycerol plus 1-mol 2-amino-1-butanol plus 2-moles sebacic acid, and is identified for convenience as $G_{(1)}(AB)_1S_{(2)}$. "Equivalent Weight/Reactive Hydrogen at AN of Zero" = [92.1 + 89.1 + 2(202.4)] − 4(18)], or approximately 257, and "Equivalent Weight/Reactive Hydrogen at AN 56" equals approximately 174.

This provides a range of polyester-amide equivalent weights for $G_{(1)}(AB)_1S_{(2)}$ of approximately 174 to 257 g./oxirane or per isocyanate. Thus for a diglycidyl ether of bisphenol A (Shell 826) having an epoxy equivalent of 184 average, and a diisocyanate such as 3,3'-dimethyldiphenyl methane 4,4'-diisocyanate having an isocyanate equivalent of 139, the relationship of equivalent weights is:

174–257 g. $G_{(1)}(AB)_1S_{(2)}$; 184 g. Shell 826 : 139 g. "diisocyanate"

In the various examples that will be included in this disclosure, differentiation will be made for equivalent weights at the processed acid number of the polyester-amide and the calculated value at AN=0.

The polyisocyanate coreactants may be neat components, such as: tolylene diisocyanate, 3,3'-dimethyldiphenylmethane 4,4'-diisocyanate, polyaryl isocyanates, methylenedi-p-phenyl diisocyanate, etc; or, isocyanate prepolymers containing terminal isocyanate groups.

The polyepoxides are generally applicable as coreactants for the rection polyester-amides and comprise the liquid diglycidyl ethers of bisphenol A, diglycidyl ethers of aliphatic diols such as Araddite RD-2 (the diglycidyl ether of butanediol), the epoxy novolacs, di and trifunctional epoxies based on hydantoin and bisphenol A (Ciby-Geigy), etc., having preferred epoxy equivalent weights from approximately 125 to 250. Amine catalysts may advantageously be included to reduce both the curing time and temperature for the reactive polyesteramide/epoxy systems.

Mixed polyepoxide/polyisocyanates are effective as coreactants, imparting some of the characteristics of each to the cured polyester-amide polymers. Also, compounds other than those containing oxirane or isocyanate groups are applicable provided they contain functional sites reactive to the labile hydrogens of the polyester-amide polymers; imine-terminated polymers is illustrative of this extension.

Variations of the reactive polyester-amide polymers make use of oxazoline polyols as the partial or complete source of both the triol and the aminoalcohol; these are formed by reaction between appropriate aminoalcohols and dimethylpropionic acid, illustrations of which are included in the examples.

EXAMPLES OF THE INVENTION

EXAMPLE 1

An aliquot of reactive polyester-amide polymer of 1-mol glycerol/1-mol 2-amino-2-butanol/2-moles sebacic acid at acid number 40 was coreacted with proportional aliquots of a diglycidyl ether of bisphenol A (Epon 826) having an average oxirane equivalent of 184, and a diisocyanate having an isocyanate equivalent of 139 (3,3'-dimethyldiphenylmethane 4,4'-diisocyanate, or "DMMDI") in the following proportions, both as 100% solids, and from solutions of methyl ethyl ketone.

|  | a | b | c |
|---|---|---|---|
| Polyester-amide (equivalent wt/reactive hydrogen calculated for acid number of zero) | 257 g. | 257 g. | 257 g. |
| Epon 826 | 184 g. | — | 138 g. |
| DMP-30 [tris(dimethylaminoethyl) phenol] | 10 g. | — | — |
| DMMDI | — | 139 g. | 35 g. |

All could be cured at less than 80° C., and within approximately one hour at 120° C. to form very tough, flexible, adherent products. Doubling the concentration of the DMP-30 (t-amine catalyst), increased the rate-of-cure but at some slight loss of physical properties, such as toughness. In contrast, a temperature of about 200° C. was required to heat-convert the polyester-amide polymer in the absence of the epoxy or isocyanate co-reactants.

EXAMPLE 2

For reactive polyester-amide resins containing 1-mol glycerol:1-mol 2-amino-1-butanol:2-moles dibasic acid, in the series itaconic to sebacic acid as the chain length of the dibasic acid increased, cured reaction products with Epon 826 and the diisocyanate of Example 1 decreased in hardness and improved in toughness and flexibility; also, the physical properties of the co-reacted products could be varied and controlled by using mixtures of the aliphatic dibasic acids.

EXAMPLE 3

Indulin AT, a kraft pine lignin from Westvaco Chemical Division of the Polychemicals Department in South Carolina, was used as partial replacement for glycerol; a unit weight of approximately 840 was taken for the lignin with four hydroxyl groups per repeating unit. The polyester-amide resin comprised: glycerol, 0.9 mol; lignin, 0.1 mol; 2-amino-1-butanol, 1 mol; and sebacic acid, 2 moles. The equivalent weight at acid number zero was calculated as 280, based on the remaining reactive hydrogens. The polymerization was conducted to an acid number of approximately 45 with and without a mutual solvent, i.e., dimethyl formamide with comparable results. Formulated as a co-reactant with the diepoxide of Example 1 produced adherent, flexible products showing improved toughness by the use of lignin as a polyol component; cure was effected rapidly at less than 120° C. with an acceleration in the rate-of-cure by doubling the concentration of DMP-30.

Substituting tris(2-hydroxyethyl)isocyanurate (0.9 mol) for glycerol, and azelaic acid (2 moles) for sebacic produced harder and more abrasion-resistant reaction products with the diepoxide of Example 1 when combined one equivalent weight polyester-amide/reactive hydrogen (calculated 339 at AN=0) per oxirane.

Mixed amines, DMP-30(Ex.1) and triethylene tetramine, was effective in reducing the temperature and the time of cure without adversely effecting the physical properties, such as toughness, flexibility, and adhesion, of the reaction products. The reactive polyester-amides included the following, each at approximately AN 45:

|  | a | b | c | d |
|---|---|---|---|---|
| Glycerol | 0.9 mol | 1.0 mol | — | — |
| Tris(2-hydroxyethyl)-isocyanurate (Allied Chem) | — | — | 0.9 mol | 1.0 mol |
| Lignin(Indulin AT) (Westvaco Chemical) | 0.1 mol | — | 0.1 mol | — |
| Sebacic acid | 2.0 moles | 2.0 moles | — | 2.0 moles |
| Azelaic acid | — | — | 2.0 moles | — |
| 2-amino-1-butanol | 1.0 mol | 1.0 mol | 1.0 mol | 1.0 mol |
| Calc. equiv. wt. at acid no. of zero | 280 | 257 | 339 | 342 |

Room temperature cures were obtained for each of the polymers when coreacted with Epon 826 (1:1 equiv. wts., with polyester-amide calc. at acid number of zero) using a mixed catalyst of 18 g. each DMP-30 and triethylene tetramine per oxirane; the deposits were tough, flexible, abrasion-resistant, and adherent. Reducing the amine concentrations by ½ or nine grams of each per oxirane required longer than an overnight cure at ambient temperature to become tack-free, but within 1–2 hours at less than 80° C. both catalyst systems gave comparable results.

EXAMPLE 4.

For a DMP-30 catalyzed epoxy/polyester-amide system, the physical properties of the cured reaction products could be varied by controlling the ratio of glycerol:tris(2-hydroxyethyl)isocyanurate, while maintaining the other components constant, i.e., the amino alcohol and the dibasic acid. Using a concentration of 21 g. DMP-30/equivalent weight of epoxy, the polyester-amide/epoxies cured rapidly within less than one hour at about 107° C.

EXAMPLE 5

Reactive polyester-amide of Ex. 1 was used as a co-reactant for epoxy resins other than the diglycidyl ether of bisphenol A of Ex. 1; these included a Dow epoxy novolac (DEN 439, epoxy equivalent of 200), Shell 829 (epoxy equivalent, 200), a diglycidyl ether of 1,4-butanediol (Ciba's Araldite RD-2, epoxy equivalent, 136), and Ciba-Geigy's experimental epoxy resins based on hydantoin and bisphenol A (XB2826, a difunctional epoxy having a weight per epoxide of 161; XB2818, a trifunctional epoxy having a weight per epoxide of 163; and XB2793, a difunctional epoxy having a weight per epoxide of 138. Proportional aliquots were taken of reactive polyester-amide, epoxy, and DMP-30, based of one equiv. wt. per reactive hydrogen of polyester-amide at acid number of zero, one equivalent weight of oxirane, and 10 g. of DMP-30 per oxirane. All cured within one hour at 100° C. to form tough, horny, flexible, adherent deposits. Property retention, was found good up to at least 200° C.

EXAMPLE 7

Using the reactive polyester-amide polymer of Ex.1, the ratio of polyester-amide to the epoxy resin of EX.1 was varied from the one equivalent weight polyester-amide at acid number zero per oxirane to a range of epoxy of 0.45 oxirane to 1.82 epoxy equivalents per polyester-amide (calculated to AN,0). Based on the rate-of-cure using DMP-30 catalysis and the physical properties of hardness, toughness, and flexibility, the optimum range of polyester-amide polymer to epoxy was judged to be from approximately 0.7 oxirane to 1.5 oxiranes per calculated equivalent weight of reactive polyester-amide at acid number of zero.

Comparison of the equivalent weights of polyester-amide polymer of Ex.1, calculated for acid number zero, vs its equivalent weight/reactive hydrogen at AN-56 indicated the useable (applicable) range to be compatible within the above empirical determination. Thus one equivalent weight of the polyester-amide polymer of Ex. 1 for AN-56(calculated equiv. wt., 174) and AN-0 (calculated equiv. wt., 257), was reacted with equivalent weights of tolylene (isocynanate equivalent, 87) and the diisocyanate of Ex. 1 (isocyanate equivalent, 139). All cured tack-free at room temperature and improved in toughness after about ¾ hour at 93° C. The results substantiate conclusions reached with the epoxy study, indicating a broad, useful range of reactive polyester-amide polymer as a co-reactant with polyisocyanates and polyepoxides.

EXAMPLE 8

Isocyanate prepolymers were prepared and used as co-reactants with polyester-amides of Ex. 1 and Ex. 3 (numbers a,c,d). The polyester-amide equivalent weights were calculated values at AN-0 and at the processed acid numbers (AN35-40). Representative of the isocyanate prepolymers is the following: Vircol 82 (a phosphorous-containing polyol of the Mobil Chem. Co., hydroxyl number of 205), 100 g; m-tolylene diisocyanate, 100 g; PAPI 500(polyarylisocyanate, CPR Industries), 217 g. Processing was conducted in a closed system for one hour at 80° C; the equivalent weight per isocyanate was calculated as approximately 180. All of the mixtures set rapidly at room temperature for ratios of 1-equiv. wt. NCO:1-equiv. wt. polyester-amide to form hard, tough, flexible, abrasion-resistant deposits. For coatings formed from solutions of the polyester-amide polymers, improved results with regard to absence of bubbling were obtained by using a drying agent such as anhydrous calcium sulfate to pre-dry the polyester-amide solutions.

EXAMPLE 9

A polymerized fatty acid ("dimer acid") was substituted for part of the aliphatic dibasic acid, as follows: tris(2-hydroxyethyl)isocyanurate, 1-mol; 2-amino-1-butanol, 1-mol; adipic acid, 1.5 moles; and Empol 1022, ½ mol (Emery Industries dimerized fatty acids, reportedly containing 75% dimer content, 22% trimer content, and 3% monomer content). The polyester-amide polymer was used as a co-reactant with the diepoxide of Ex. 1, and with m-tolylene diisocyanate; the polyester-amide equivalent weights included its calculated value at acid number of zero and its value at the processed acid number of 68. The trifunctional content of the dimer acid increased the toughness and rigidity of the cured products. It was also found that: with 10 g. of the t-amine catalyst of Ex. 1 per oxirane, cure was accomplished at approximately 110° C. within two hours; using the mixed amine catalyst system of Ex. 3, cure proceeded effectively at room temperature; with isocyanate as the co-reactant, the reaction product became tack-free within two hours at room temperature.

EXAMPLE 10

A modified triol, pentaerythritol monodocosanoate, was used as partial substitution for tris(2-hydroxyethyl)isocyaurate, the polyester-amide comprising: ½ mol pentaerythritol monodocosanoate; ½ mol of the isocyanurate triol; 1-mol of 2-amino-1-butanol; and 2-moles of azelaic acid. The pentaerythritol monodocosanoate was prepared by reacting 1-mol of pentaerythritol, 1-mol of docosanoic acid, and 0.025 mol sodium stearate (catalyst) for one hour at 210°-220° C. The calculated equivalent weight per reactive hydrogen for the polyester-amide resin was approximately 377. Used as a co-reactant with the diepoxide of Ex. 1, very flexible, tough, adherent products were obtained; heating at 200° C. resulted in no apparent adverse effect on its adhesion, toughness, or flexibility.

EXAMPLE 11

2-amino-2 methyl-1-propanol was substituted for the 2-amino-1-butanol in the reactive polyester-amide resin of Ex. 1, which was then co-reacted with the diepoxide of Ex. 1 with catalyst systems of 8.4 g. DMP-30 per oxirane and the mixed amine catalysts of Ex. 3. The results of both cured reaction products of the two polyester-amide resins were comparable, showing no major effect by substituting the isomeric amino alcohol.

EXAMPLE 12

Oxazoline polyols, prepared by condensation reaction at 175°-185° C., between dimethylol propionic acid and the appropriate amino alcohol, were used as components of the reactive polyester-amides of this invention. The oxazoline diol was prepared by reacting 1-mol diethylol propionic acid with 1-mol 2-amino-1-butanol; the oxazoline triol by reaction between 1-mol dimethylol propionic acid and 1-mol of 2-amino-2-ethyl-1,3 propanediol; and the oxazoline tetrol, by reaction between 1-mol dimethylol propionic acid and 1-mol of tris(hydroxymethyl)-aminomethane.

The oxazoline diol was used as partial replacement for 2-amino-1-butanol in the polyester-amide resin of Ex. 1, as follows: glycerol, 1-mol; oxazoline diol, ½ mol; 2-amino-1-butanol, ½ mol; and sebacic acid, 2-moles.

The oxazoline triol was used as total replacement for glycerol in the polyester-amide of Ex. 1.

The oxazoline tetrol was used as partial replacement for glycerol in the polyester-amide resin of Ex. 1, i.e., glycerol ( mol) plus oxazoline tetrol (¼ mol) plus 2-amino-1-butanol (1-mol) and, plus sebacic acid (2-moles).

Each of the oxazoline polyol type polyester-amide resins was reacted with the diepoxide of Ex. 1, at weight ratios of one equivalent polyester-amide (calculated at AN-0): one oxirane, with and without the t-amine catalyst of Ex.1, and the mixed catalyst system of Ex. 3. In each case, the relatively low temperature-cured reaction products were tough, flexible, and adherent.

Additionally, bis(oxazoline), prepared by reaction between 2-moles of 2-amino-2-ethyl-1.3 propanediol and 1-mol of adipic acid at 175°-185° C., was used as total replacement for 2-amino-1-butanol in the polyester-amide of Ex. 1. The revised resin prepared by reaction between 1½ moles glycerol, 1-mol bis(oxazoline), and 2-moles of sebacic acid, was very effective as a curing agent for the diepoxide of Ex.1. The system of polyester-amide polymer and epoxy cured rapidly, less than one hour, at approximately 100° C. without amine-catalysis.

I claim:

1. Reactive polyester-amide polymers having an acid number of 25–100, as co-reactants for polyepoxides and polyisocyanates, prepared from reactants consisting of: 1-mol of a triol selected from the group consisting of glycerol, tris(2-hydroxyethyl)isocyanurate, 1-2-4-hexanetriol, trimethylol propane, and trimethylol ethane; 1-mol of an amino-alcohol selected from the group consisting of 2-amino-1-butanol, and 2-amino-2-methyl-1-propanol; and 2-moles of an aliphatic dibasic acid selected from the group consisting of adipic, pimelic, suberic, azelaic, and sebacic acids.

2. Reactive polyester-amide polymers having an acid number of 25-100, as co-reactants for polyepoxides and polyisocyanates, prepared from reactants consisting of: a compound selected from the group consisting of glycerol, tris(2-hydroxyethyl)isocyanurate, 1-2-4-hexanetriol, trimethylol propane, and trimethylol ethane as the principal polylol, and up to 0.25 mol of polyhydroxy compound selected from the group consisting of castor oil, lignin, and mono-fatty esters of pentaerythritol as a modifying polylol; an amino-alcohol selected from the group consisting of 2-amino-1-butanol, and 2-amino-2-methyl-1-propanol; and an aliphatic dibasic acid selected from the group consisting of adipic, pimelic, suberic, azelaic, and sebacic acids, within a total of 3-hydroxy groups for the principal and modifying polyols:mol of amino-alcohol:2-moles of dibasic acid.

3. Reactive polyester-amide polymers having an acid number of 25-100, as co-reactants for polyepoxides and polyisocyanates, prepared from reactants consisting of:1-mol of a triol selected from the group consisting of glycerol, tris(2-hydroxyethyl)isocyanurate, 1-2-4-hexanetriol, trimethylol propane, and trimethylol ethane; 1-mol of an amino-alcohol selected from the group consisting of 2-amino-1-butanol, and 2-amino-2-methyl-1-propanol; a compound selected from the group consisting of adipic, pimelic, suberic, azelaic, and sebacic acids as the principal aliphatic dibasic acid, and up to 0.25 mol polymerized fatty acids comprised of 75% dimer content, 22% trimer content, and 3% monomer content as a modifying carboxylic acid, within a total of 4-carboxylic acid groups for the principal and modifying acids:mol triol:mol amino-alcohol.

* * * * *